United States Patent [19]

Spencer et al.

[11] 3,977,213
[45] Aug. 31, 1976

[54] EXPLOSIVELY ACTUATED OVERSPEED DECOUPLER

[75] Inventors: Donald B. Spencer, Portland; John E. Ferguson, Aloha, both of Oreg.

[73] Assignee: Guy F. Atkinson Company, San Francisco, Calif.

[22] Filed: Mar. 7, 1975

[21] Appl. No.: 556,209

[52] U.S. Cl. ............................... 64/28 R; 64/9 R; 285/3; 403/2
[51] Int. Cl.² .......................................... F16D 3/56
[58] Field of Search ............. 64/28, 28 M, 9; 285/3, 285/2; 403/2

[56] References Cited
UNITED STATES PATENTS

| | | | |
|---|---|---|---|
| 3,000,577 | 9/1961 | Ferguson | 64/28 R |
| 3,265,408 | 8/1966 | Dickie | 285/3 |
| 3,753,625 | 8/1973 | Fabrizio et al. | 64/28 R |
| 3,779,354 | 12/1973 | Ball | 64/9 |

*Primary Examiner*—Samuel Scott
*Assistant Examiner*—Randall Heald
*Attorney, Agent, or Firm*—Lee R. Schermerhorn

[57] ABSTRACT

Concentric driving and driven clutch rings have teeth in a common radial plane on one end of the rings. The clutch rings are normally coupled together by a coupler ring having teeth engaging the teeth of both clutch rings, this engagement being maintained by an axial clamp bolt. In the event of dangerous overspeed the clamp bolt is broken and the coupler ring is disengaged from the clutch rings by an explosive charge acting on an axial piston. The explosive charge is detonated by a firing pin actuated by a steel ball impelled by centrifugal force. The ball is retained by a magnet until centrifugal force exceeds the magnetic force holding the ball.

17 Claims, 3 Drawing Figures

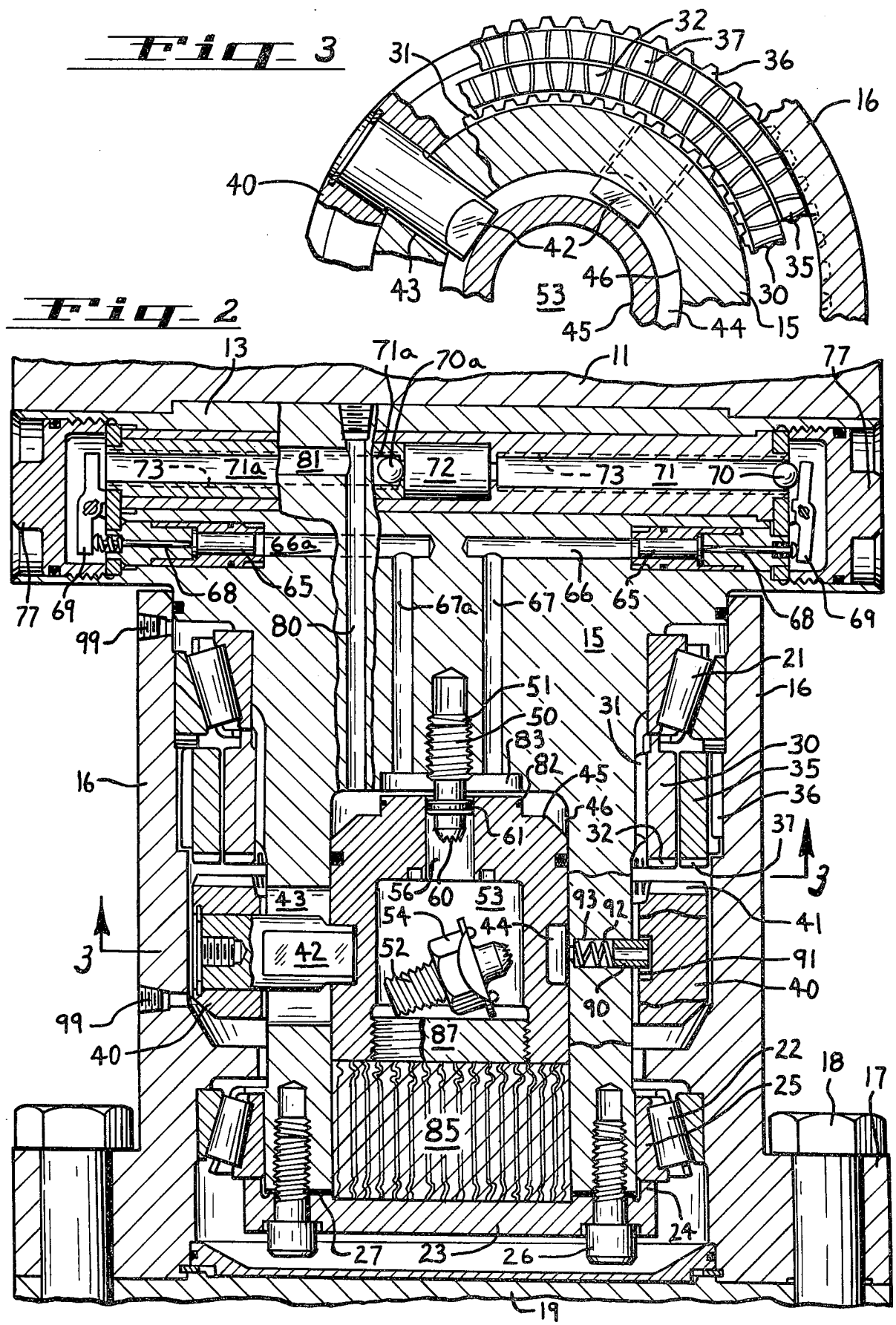

EXPLOSIVELY ACTUATED OVERSPEED DECOUPLER

BACKGROUND OF THE INVENTION

This invention relates to an explosively actuated overspeed decoupler for disconnecting a rotary driven member from a driving member.

While the invention is not limited to any particular application, in certain pumping installations it is necessary to decouple the motor from a pump in the event of failure in the hydraulic system. Such failure may make it possible for pumped water or other fluid under high pressure to flow through the pump operating the pump as a turbine to overdrive the motor at an excessive speed.

Available decoupling devices are not suitable for the present purpose. The decoupler must be precise in its response to overspeed, insensitive to acceleration, completely reliable in operation and must have various other qualities to suit the present purpose.

Objects of the invention are, therefore, to provide a decoupler which effects positive torsional decoupling at a precise overspeed, to provide a decoupler which is operable in either direction of rotation, to provide a decoupler which maintains the axial length and transverse stiffness and rigidity of a spool-type coupling, to provide a decoupler which maintains the driving and driven parts in alignment while supporting an axial thrust load either in tension or in compression, to provide a decoupler having a mechanically rugged and symmetrical configuration of elements, to provide a decoupler having an energy absorbing system which controls safely the motions of the coupling parts after the decoupling action takes place, to provide a decoupler capable of functioning within one to two milliseconds after overspeed reaches a preset limit, to provide a decoupler that is insensitive to rotational accelerations and/or seismic forces and will respond only to a preset absolute rotational velocity, to provide a decoupler having redundant overspeed sensing means and redundant actuating means either of which is capable of completing the decoupling action, and to provide such a decoupler which can safely withstand simultaneous operation of both redundant explosive decoupling actuator systems.

SUMMARY OF THE INVENTION

In the present construction, concentric driving and driven clutch rings have teeth in a common radial plane on one end of the rings. The clutch rings are normally coupled together by a coupler ring having teeth engaging the teeth of both clutch rings, this engagement being maintained by an axial clamp bolt.

In the event of dangerous overspeed the clamp bolt is broken and the coupler ring is disengaged from the clutch rings by an explosive charge acting on an axial piston. The explosive charge is detonated by a firing pin actuated by a steel ball impelled by centrifugal force. The ball is retained by a magnet until centrifugal force exceeds the magnetic force holding the ball. A redundant explosive system is provided to insure certainty of operation.

In the preferred embodiment which is described and illustrated herein by way of example the decoupler comprises a spool-type coupling. A driving motor is connected to one end of the coupling and a pump impeller is connected to the other end of the coupling. If some failure in the pumping system should permit the pumped liquid to flow through the pump impeller under high pressure to rotate the motor at an unsafe speed the decoupler instantly effects a torsional disconnection between the impeller and motor while continuing to maintain the impeller in its normal operating position.

The invention will be better understood and additional objects and advantages will become apparent from the following description of the preferred embodiment illustrated in the accompanying drawings. Various changes may be made, however, in the details of construction and arrangement of parts and certain features may be used without others. All such modifications within the scope of the appended claims are included in the invention.

BRIEF DESCRIPTION OF THE DRAWINGS

FIG. 2 is a view similar to FIG. 1 showing the parts in decoupled positions; and FIG. 3 is a fragmentary cross-sectional view taken approximately on the line 3—3 in FIG. 2.

DESCRIPTION OF THE PREFERRED EMBODIMENT

Figure 1:
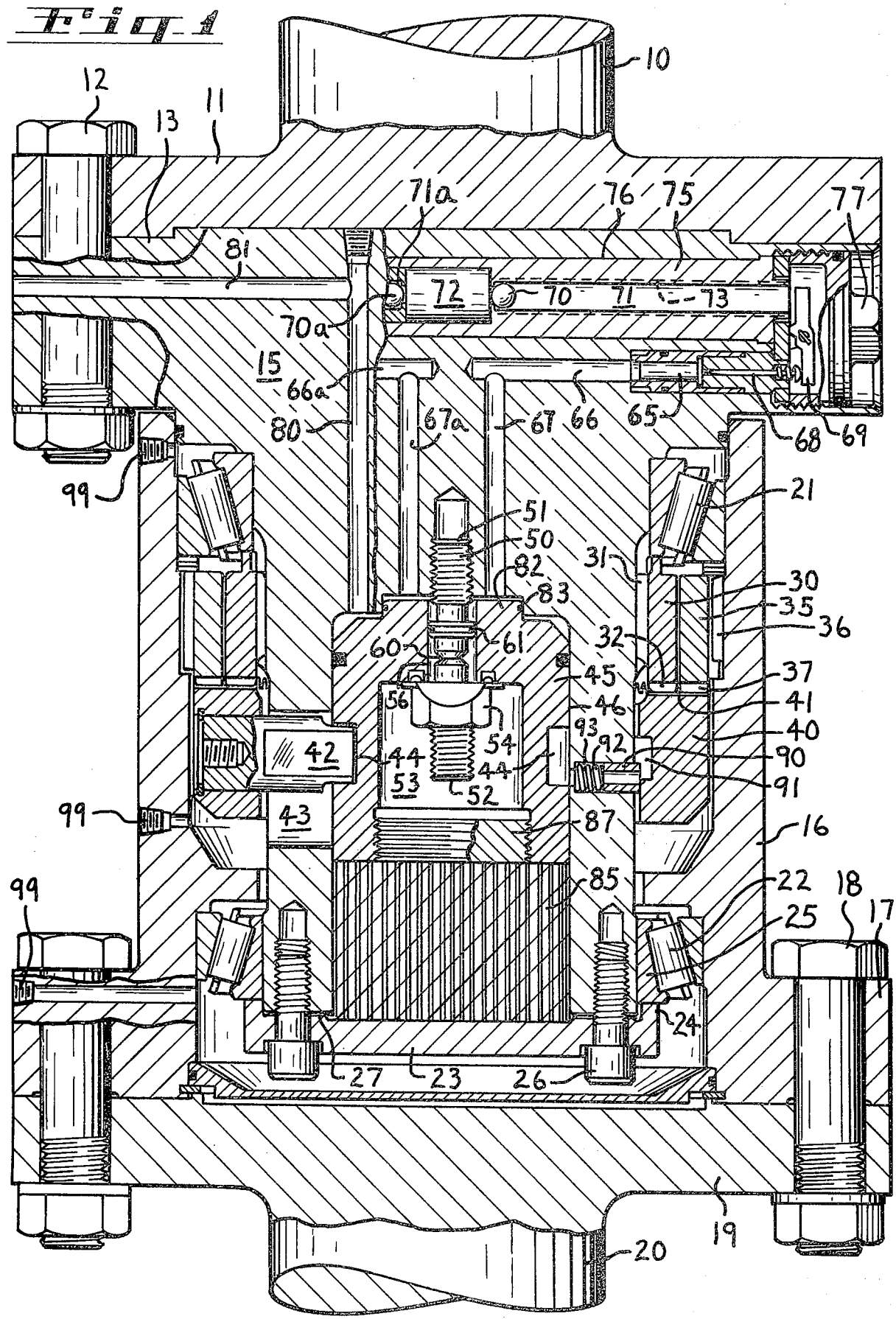
FIG. 1 is a vertical offset sectional view with parts broken away showing a decoupler embodying the invention, with the parts in normal operation condition.

In the present construction a drive motor has a vertical shaft 10 equipped with a bolting flange 11 secured by bolts 12 to a bolting flange 13 on the driving member 15 of the decoupler. The driven member 16 of the decoupler has a similar bolting flange 17 secured by bolts 18 to a bolting flange 19 on the upper end of the vertical impeller shaft 20 of a pump whereby the impeller is supported and driven by the motor.

In normal operation, driven member 16 rotates with driving member 11. Upper and lower bearings 21 and 22 provide for relative rotation when driven member 16 is decoupled from driving member 11. A retainer plate 23 on the lower end of driving member 15 has a flanged rim 24 supporting the inner race ring 25 of lower bearings 22. The position of race ring 25 is adjusted by means of cap screws 26 and shims 27 to preload the bearings so as to avoid any looseness in the bearings under all modes of operation and maintain axial stiffness and a fixed axial length of the decoupler after decoupling so that the impeller on shaft 20 will not change position after decoupling.

A face clutch ring 30 has a spline and groove connection at 31 with driving member 15. The lower face of ring 30 is equipped with radially extending axial teeth 32. Concentric with ring 30 a face clutch ring 35 has a spline and groove connection at 36 with driven member 16. The lower face of ring 35 has radially extending axial teeth 37 in the plane of teeth 32. The rings 30 and 35 are in fixed axial position, ring 30 being a driving ring and ring 35 being a driven ring in normal operation.

Immediately below the rings 30 and 35 is a vertically movable face clutch coupler ring 40 having radially extending axial teeth 41 on its upper end which normally engage both sets of teeth 32 and 37 to couple driven member 16 to driving member 15. Coupler ring 40 is normally held in engaged position by four inwardly extending radial pins 42 in the ring 40. Pins 42 project through vertical slots 43 in driving member 15 and have square ends which engage an annular groove 44 in an axial piston 45. Pins 42 and slots 43 prevent relative rotation between driving member 15 and coupler ring 40.

Piston 45 is mounted in an axial bore 46 in driving member 15. The piston is normally held in raised position as shown in FIG. 1 by a clamp bolt 50 which has its upper end screwed into a tapped hole 51 in driving member 15. The lower end 52 of the clamp bolt extends into a chamber 53 in the piston and is equipped with a nut 54 which supports the piston. The intermediate portion of bolt 50 extends through a hole 56 in the top of the piston and is provided with a reduced neck 60 which allows the bolt to be broken by an explosive force applied to the top of the piston. The bolt is sealed in hole 56 by a seal ring 61.

An explosive force may be applied to the top of the piston by an explosive cartridge 65 which communicates with piston bore 46 through lateral and vertical passageways 66 and 67. Cartridge 65 is detonated by a firing pin 68 when the latter is struck by the lower end of a pivotal rocker arm 69. The necessary striking force is applied to the upper end of rocker arm 69 by the movement of a ball 70 which is driven radially outward by centrifugal force.

Ball 70 is contained in a radial bore 71 aligned with the upper end of rocker arm 69. Ball 70 is made of a suitable magnetic material such as steel and is normally held at the inner end of bore 71, close to the axis of rotation of the decoupler, by a magnet 72. Magnet 72 holds ball 70 in this position as shown in FIG. 1 at normal operating speed whereby driven shaft 20 normally remains coupled to driving shaft 10 as above described.

At a predetermined overspeed, centrifugal force acting on ball 70 exceeds the magnetic attraction of magnet 72, releasing the ball to travel outward in bore 71 until the ball strikes the upper end of rocker arm 69, causing firing pin 68 to detonate the explosive charge in cartridge 65. The explosive force thus generated passes through passageways 66 and 67 to act on the top of piston 45. Longitudinal grooves 73 in bore 71 allow a flow of air around the ball so that there is no dashpot effect to retard the outward velocity of the ball.

The explosive force acting on the upper end of piston 45 is sufficient to break clamp bolt 50 at its reduced neck 60, causing the piston to move downward. Downward movement of the piston is imparted through pins 42 to coupler ring 40, disengaging the coupler teeth 41 from driving teeth 32 and driven teeth 37, thereby decoupling driven member 16 from driving member 15.

The release of ball 70 in the manner described is responsive solely to absolute rotational speed. The release is not affected by rotational acceleration or deceleration or by other types of forces acting on the coupler.

To insure certainty of operation, a redundant actuating system is provided. For this purpose the bore 71 is formed in a tube 75 which is inserted in a diametral bore 76 in driving member 15. The outer ends of this bore are closed by screw caps 77, each covering an explosive cartridge, firing pin and rocker arm assembly as shown in FIG. 2, whereby the two actuating mechanisms are in rotational balance on the axis of shafts 10 and 20. Bore 71a is in alignment with bore 71 and contains a second magnetic ball 70a. A single magnet 72 may hold both balls 70 and 70a or there may be two magnets mounted symmetrically with respect to the common axis of shafts 10 and 20.

When overspeed occurs, it is statistically unlikely that both balls 70 and 70a will release from magnet 72 precisely at the same instant. And it is not necessary for the second ball to be released at all. When either one of the balls releases, it fires the cartridge which is controlled by that ball and causes decoupling action. In the event that a cartridge 65 does not explode or fails to cause decoupling when struck by its firing pin, any further increase in the overspeed immediately releases the second ball to fire the other cartridge and provide the desired safety factor in this respect. Passageway 66a communicates with passageway 67a.

The explosive gases are vented from piston bore 46 through passageways 80 and 81. Piston 46 has a stepped upper end 82 of reduced diameter which slides in a short counter bore 83. The initial pressure wave of the explosion from cartridge 65 thus acts first on the smaller area of piston part 82 to start the downward acceleration of the piston. The initial pressure wave is confined in the counter bore 83 and does not have access to escape vent 80.

By the time piston portion 82 clears the counter bore 83, the piston has reached a relatively high downward velocity and the force of the explosion then acts on the piston over the whole area of bore 46. Thus the piston has completed its downward movement before there is any substantial release of pressure through vent passageways 80 and 81. Escape of the explosion gases through passageway 80 is slightly delayed by the necessity of reversal of direction from downward to upward.

The kinetic energy of the downwardly moving piston 45, coupler ring 40 and radial pins 42 is absorbed by a shock pad 85 to prevent damage to the mechanism. Shock pad 85 preferably comprises a block of aluminum honey comb in a hermetically sealed can having vertical cells which may be crushed to some extent by the piston. Shock pad 85 is mounted facing a retainer plate 87 which is screwed into the lower end of the piston. Retainer plate 87 closes the lower end of chamber 53 and retains the lower end portion of clamp bolt 50 when the bolt is broken apart at neck 60, as shown in FIG. 2.

Means are provided to prevent upward rebound of coupler ring 40 after it has been disengaged from driving and driven clutch rings 30 and 35. When ring 40 has been driven downward by piston 45, it is locked in its lower or disengaged position as shown in FIG. 2 by a pair of pins 90 which are projected into recesses 91 in the ring 40 by springs 92. Pins 90 and springs 92 are contained in bores 93 in opposite sides of driving member 15 between the slots 43. The views in FIGS. 1 and 2 are not diametral sections.

In certain high pressure pumping systems such as systems pumping hot water at a high pressure, a breakage of some pipe, fitting or valve may result in sudden release of pressure permitting the hot water to flash into steam, generating an abnormal fluid flow through the circulating pump on shaft 20. A dangerous overspeed of shaft 20 may then result, in the direction of normal rotation or in the opposite direction, depending on the location of the break.

In either case, at least one of the balls 70, 70a will respond instantly to the overspeed and decouple the pump impeller on shaft 20 so that the motor and/or any fly wheel connected with shaft 10 are not damaged. After decoupling, the bearings 21 and 22 hold driven member 16 and shaft 20 rigidly in normal operating position and maintain a fixed vertical dimension between the ends of shafts 10 and 20 while allowing free relative rotation therebetween. Thus, the pump impeller continues to be supported in its normal operating position by motor shaft 10 for a time limited only by the rise in temperature at the bearings due to friction.

Tapped holes 99 receive plugs to close oil fill and drain ports to provide for the lubrication of bearings 21 and 22.

When shock pad 85 is disposed in contact with piston 45 as shown in FIG. 1, the shock pad assists clamp bolt 50 in keeping the clutch parts engaged in normal operation. It is also possible to rely entirely on shock pad 85 to keep the clutch parts engaged, thereby eliminating clamp bolt 50 and hole 56 in the piston.

The present decoupler provides axial thrust capability in compression or tension and in both the coupled and the decoupled states. It may be installed upside down relative to the present illustration and the axis of rotation may be horizontal or at any desired inclination.

Having now described the invention and in what manner the same may be used, what is claimed as new and desired to protect by Letters Patent is:

1. A decoupler comprising a rotary driving member and a coaxial rotary driven member, a driving ring connected with said driving member, a driven ring concentric with said driving ring connected with said driven member, axial teeth on said rings projecting in the same axial direction, a coupler ring coaxial with said driving and driven rings and having axial teeth projecting in an opposite axial direction in confronting relation to the teeth on said driving and driven rings, means holding said coupler ring teeth in engagement with said driving and driven ring teeth causing said driven member to be driven by said driving member, and axial means for shifting said coupler ring axially away from said driving and driven rings to decouple said members.

2. A decoupler as defined in claim 1, said driving ring teeth and driven ring teeth being disposed in a common radial plane.

3. A decoupler as defined in claim 1, said shifting means further including radial pins in said coupler ring engaged in recesses in said piston.

4. A decoupler as defined in claim 1, said holding means comprising a frangible bolt adapted to be broken by said piston.

5. A decoupler as defined in claim 1, said holding means comprising a deformable shock pad engaging said piston.

6. A decoupler as defined in claim 1, said holding means comprising a frangible bolt adapted to be broken by said piston and a deformable shock pad engaging said piston.

7. A decoupler as defined in claim 6, said shock pad comprising a block of honey comb material.

8. A decoupler as defined in claim 1 including means to hold said coupler ring in shifted position out of engagement with said driving and driven ring teeth after said driving and driven members have been decoupled.

9. A decoupler as defined in claim 9, said means to hold said decoupler ring in shifted position comprising spring actuated radial pins in one of said members engagable in recesses in said coupler ring.

10. A decoupler as defined in claim 1 including an explosive charge arranged to actuate said piston.

11. A decoupler as defined in claim 9, said piston being disposed in a bore in one of said members, a vent passageway communicating with said bore, said piston having an end portion of reduced diameter, a counter bore receiving said reduced end portion, and a passageway from said explosive charge to said counter bore.

12. A decoupler as defined in claim 10 including means responsive to centrifugal force arranged to explode said explosive charge.

13. A decoupler as defined in claim 12, said means responsive to centrifugal force comprising a body movable in a radial direction in one of said members, and means restraining said body against movement at normal operating speeds of said driving and driven members.

14. A decoupler as defined in claim 13, said body comprising a magnetic material and said retaining means comprising a magnet.

15. A decoupler as defined in claim 14, including a redundant actuating system for said piston comprising a second explosive charge, radially movable magnetic body, and magnet.

16. A decoupler as defined in claim 1, said driven member being mounted on bearings on said driving member, said bearings maintaining the axial length and transverse rigity of said decoupler while permitting relative rotation between said driving and driven members after decoupling, said decoupler having axial thrust capability in both compression and tension in both coupled and decoupled states.

17. A decoupler comprising a driving shaft and a driven shaft, a driving member fixed on said driving shaft, a driven member fixed on said driven shaft, a pair of axially spaced bearings in said decoupler supporting said driven member and driven shaft for rotation on said driving member, a jaw clutch having a movable member arranged to transmit torque between said driving and driven members, means holding said clutch member in an engaged position, explosively actuated means in said decoupler for disengaging said clutch member, and means in said decoupler responsive to centrifugal force arranged to actuate said explosively actuated means at a predetermined rotational speed, said bearings maintaining the axial length and transverse rigidity of said decoupler and providing axial thrust capability in both tension and compression in both coupled and decoupled states of the decoupler.

* * * * *

UNITED STATES PATENT OFFICE
CERTIFICATE OF CORRECTION

PATENT NO. : 3,977,213
DATED : August 31, 1976
INVENTOR(S) : DONALD B. SPENCER, et al It is certified that error appears in the above-identified patent and that said Letters Patent are hereby corrected as shown below:

Column 6, line 5, for "claim 9" read --claim 8--; line 11, for "claim 9" read --claim 10--.

Signed and Sealed this

Second Day of November 1976

[SEAL]

Attest:

RUTH C. MASON
Attesting Officer

C. MARSHALL DANN
Commissioner of Patents and Trademarks